United States Patent
Winner et al.

(10) Patent No.: US 6,856,906 B2
(45) Date of Patent: Feb. 15, 2005

(54) METHOD AND DEVICE FOR INITIATING AND EXECUTING A DECELERATION OF A VEHICLE

(75) Inventors: Hermann Winner, Bietigheim (DE); Martin Heinebrodt, Stuttgart (DE); Ulf Wilhelm, Rutesheim (DE); Michael Knoop, Ludwigsburg (DE); Goetz Braeuchle, Reichertshausen (DE); Michael Weilkes, Sachsenheim (DE); Werner Uhler, Bruchsal (DE); Wolfgang Hermsen, Kirchheim (DE); Joachim Thiele, Tamm (DE); Martin Staemple, Ulm (DE); Fred Oechsle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/380,259
(22) PCT Filed: Jul. 11, 2002
(86) PCT No.: PCT/DE02/02546
§ 371 (c)(1),
(2), (4) Date: Aug. 8, 2003
(87) PCT Pub. No.: WO03/006291
PCT Pub. Date: Jan. 23, 2003

(65) Prior Publication Data
US 2004/0030499 A1 Feb. 12, 2004

(30) Foreign Application Priority Data
Jul. 11, 2001 (DE) .......................... 101 33 025

(51) Int. Cl.⁷ ............................................. G08G 1/16
(52) U.S. Cl. ..................... 701/301; 340/436; 340/903
(58) Field of Search .................. 701/301, 96; 340/436, 340/438, 9–3; 342/455

(56) References Cited

U.S. PATENT DOCUMENTS

| 6,085,151 | A | 7/2000 | Bruce et al. | |
| 6,256,565 | B1 | 7/2001 | Yanagi et al. | |
| 6,768,944 | B2 * | 7/2004 | Breed et al. | 701/301 |
| 2002/0022927 | A1 * | 2/2002 | Lemelson et al. | 701/301 |

FOREIGN PATENT DOCUMENTS

| DE | 195 14 654 | 10/1995 |
| DE | 195 47 111 | 6/1997 |
| DE | 197 48 898 | 5/1998 |
| DE | 198 57 992 | 6/2000 |
| DE | 100 20 744 | 6/2001 |

OTHER PUBLICATIONS

Winner et al., "Adaptive Cruise Control System Aspects and Development Trends", SAE Transactions, Society of Automotive Engineers, vol. 105, No. 961010, 1996, pp. 1412–1421.

* cited by examiner

Primary Examiner—Marthe Y. Marc-Coleman
(74) Attorney, Agent, or Firm—Kenyon & Kenyon

(57) ABSTRACT

A method and a device for triggering and implementing a deceleration of a vehicle to avoid a collision, in which, using a device for adaptive cruise control, objects in the sensor detection range are detected and measured variables are determined for each detected object. The detected objects are assigned to various object classes on the basis of the determined, associated measured variables, and the movement trajectories of the objects are predicted on the basis of the assignment of the detected objects to the particular class. Furthermore, a collision risk and an injury risk are determined from these predicted movement trajectories of the objects and the associated, detected object classes. In the event of the existence of preselected combinations of collision risks and injury risks, the deceleration devices of the vehicle are activated as a function of the degree of the collision risk.

17 Claims, 2 Drawing Sheets

METHOD AND DEVICE FOR INITIATING AND EXECUTING A DECELERATION OF A VEHICLE

FIELD OF THE INVENTION

A method and a device triggers and implements a deceleration of a vehicle to avoid a collision and/or reduce the severity of an accident. Using at least one radar, lidar, or video sensor, or a combination thereof, objects in the sensor detection range are detected and measured variables are determined for each detected object. The detected objects are assigned to various object classes on the basis of the determined, associated measured variables, and the movement trajectories of the objects are predicted on the basis of the assignment of the detected objects to the particular class. A collision risk and an injury risk are determined from these predicted movement trajectories of the objects and their associated, detected object classes and, in the event of the existence of preselected combinations of collision risks and injury risks, the deceleration devices of the vehicle are appropriately activated.

BACKGROUND INFORMATION

Conventional systems for adaptive cruise control expand the functionality of a typical cruise control in that, if a slower vehicle is detected driving in front of the particular vehicle, the cruise control is switched to an adaptive cruise control and the vehicle driving in front is followed at the same speed. The basic mode of operation of an adaptive cruise control system of this type is discussed in "Adaptive Cruise Control System Aspects and Development Trends" by winner, Witte et al., SAE paper 96 10 10, presented at the SAE International Congress and Exposition, Detroit, Feb. 26–29, 1996.

A method and a device for controlling the brake system of a vehicle, in which, even before beginning traction control, pressure is introduced into the disc brakes in the event of preselected conditions being present, no noticeable brake effect being applied to the driven wheels, is discussed in German Patent Application No. 195 47 111.

SUMMARY

According to example embodiments of the present invention, a method and a device are provided for triggering and implementing a deceleration of a vehicle to avoid a collision and/or to reduce the impact energy. The method and the device are able to initiate and execute automatic emergency braking in particular and may execute an automatically controlled steering and/or braking intervention for this purpose.

A device for adaptive cruise control detects objects in the sensor detection range and determines measured variables for each of the objects detected. On the basis of the determined measured variables, each detected object is assigned to an object class and a family of characteristic possible movement trajectories is predicted on the basis of the assigned object class. Furthermore, a collision risk and an injury risk are determined using the object class detected and the movement trajectories determined, as a function of which the deceleration devices of the vehicle may be activated.

In the present case, the avoidance of a collision also includes the reduction of the impact energy to reduce the severity of impact when collision avoidance is impossible.

The collision risk indicates the probability that the vehicle will collide with an object. The injury risk, in contrast, estimates the risk to the occupants of the vehicle due to this possible collision. In the case in which the side mirrors of two vehicles will unavoidably touch as they drive by one another, there is a high collision risk, but only a low injury risk, so that automatic triggering of deceleration is not to be implemented.

Furthermore, the device for adaptive cruise control of the vehicle may be a radar sensor, a lidar sensor, a video sensor, or a combination thereof.

Furthermore, the measured variables determined may include at least one of the following variables: distance of the object to the particular vehicle, relative speed of the object in relation to the particular vehicle speed, horizontal dimension of the object, vertical dimension of the object, geometry of the object, in particular geometry of the rear of the object, and the surface composition of the reflecting surface, which is the rear of the object in particular. Further measured variables which may be determined from the received and backscattered radar, lidar, or video signals are also conceivable.

The classification in the object classes is performed as a function of the determined measured variables, according to which the object is one of the following classes: person, motorcycle, small passenger car, large passenger car, truck, bus, crash barrier, traffic sign, building, or another object which may be characterized by the backscattered radar, lidar, or video signals.

The classification in the object classes is performed as a function of whether or not the individual objects are detectable and assignable by individual sensors or specific sensor combinations or are not detectable at all.

Furthermore, it may be advantageous for determining the movement trajectories if a characteristic vehicle dynamics model is stored for each object class, with the aid of which the family of possible movement trajectories to be predicted may be determined with higher precision.

Furthermore, it may be advantageous if the collision risk and the injury risk represent the probability of an impact with a detected object if there is no driver intervention. In the case of a scalar collision risk and a scalar injury risk, it may be advantageous if the deceleration devices are activated when threshold values are exceeded. Furthermore, it is possible that the collision risk and the injury risk are one or more vectorial variables and that specific vector conditions have to be fulfilled to activate the deceleration devices of the vehicle. Furthermore, it may be advantageous if the scalar threshold values and/or the vectorial triggering condition are not constant, but are changeable as a function of the traffic situation. Thus, it may be advantageous if the activation of the deceleration devices may be adjusted as a function of the instantaneous environmental situation.

Furthermore, the threshold value may be changeable as a function of the driver activity, i.e., the operation of the accelerator pedal, the brake pedal, or the steering wheel. In this manner it is possible to trigger the deceleration devices only at a critical point in time, when it has been detected that the driver himself is attempting a braking or avoidance maneuver. If it has been detected that the driver is not undertaking any activities, triggering may be begun even for noncritical situations.

Furthermore, it may be advantageous if, for the precalculation of the movement trajectories of the particular vehicle and the objects detected, only those trajectories are taken into consideration in which the forces arising on the wheels of the vehicle due to a combination of steering and braking interventions are not greater than the maximum force which may be transmitted from the wheel onto the roadway. By eliminating those movement trajectories in which steering and braking forces arise which may not be transmitted from the wheel onto the roadway, the computing capacity necessary for determining the movement trajectories may be reduced and the performance of the system may thus be increased.

The implementation of the method according to the present invention in the form of a control element which is provided for a control unit of an adaptive cruise control system of a motor vehicle is of particular significance. In this case, a program is stored on the control element which is executable on a computing device, in particular on a microprocessor or ASIC, and is capable of implementing the method according to the present invention. Thus, in this case, the present invention is thus implemented by a program stored on the control unit, so that this control unit provided with the program constitutes the present invention in the same manner as the method, for whose execution the program is suitable. An electrical storage medium, for example, a read-only memory, may, in particular, be used as a control element.

DETAILED DESCRIPTION

Figure 1:
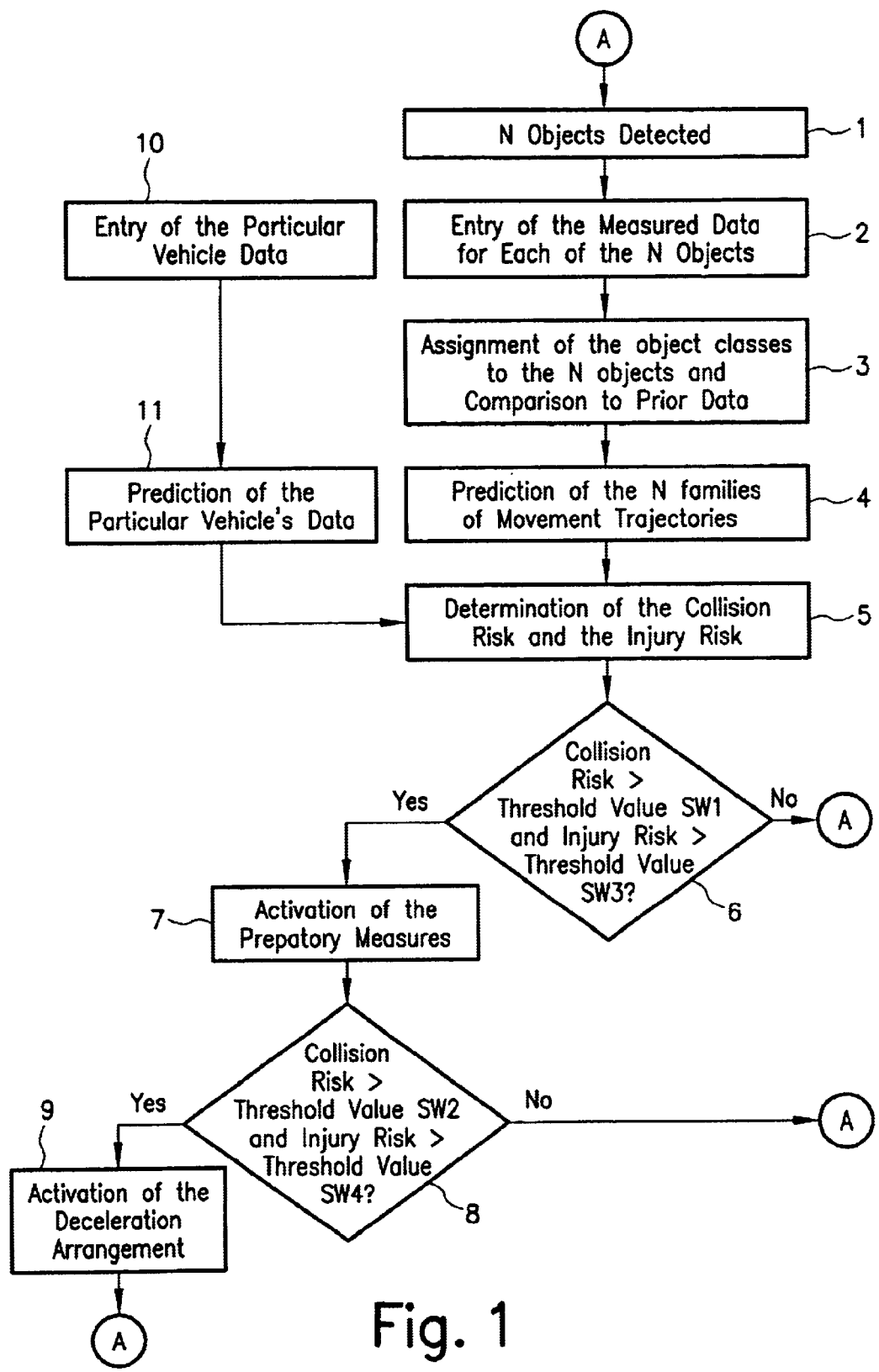
FIG. 1 shows a flow chart for performing the method according to the present invention.

FIG. 1 shows a flow chart of an example embodiment of the method according to the present invention. This flow chart represents an endless loop and is continuously repeated. In block 1, the environmental sensor system, in the form of a radar, lidar, or video sensor, determines how many objects lie in the detection range of the sensor. These n detected objects are stored in the memory. In block 2 of the flow chart, the measurement data is entered for each of the n objects. In this case, this data includes various variables which are provided directly from the environmental sensor system. The measured variables may be one or more of the following variables: relative speed of the object to the particular vehicle, distance of the object, horizontal dimension of the object, vertical dimension of the object, geometry of the object, and surface composition of the reflecting surface. These measured data at point in time t+Δt are compared to the measured data of the preceding measurement cycle at point in time t to determine whether the object detected is an object detected for the first time or an already detected object which has moved in the meantime. Further variables may also be derived from the time derivative of these changes, the acceleration from measured speed values, for example. In subsequent step 3, an object class is selected on the basis of the measured data associated with the object. This is done, for example, using correlation of the characteristic object classes to the measured data. Characteristic patterns of the particular objects are used as object classes. Thus, for example, a motorcycle includes a radar backscatter cross-section that is different from that of a truck, and a vehicle has a characteristic speed that is different from that of a stationary building. On the basis of these types of properties of the object classes, each object is assigned an object class in the measured data of each object, using a correlation analysis. A family of movement trajectories is predicted for each of the n objects in step 4 of the flow chart. A characteristic vehicle dynamics model, which is stored for each of the object classes, is used for this purpose. Thus, for example, a motorcycle is capable of executing more rapid steering movements than are possible for a bus or a truck, for example. The particular vehicle dynamics model, which is used as an aid according to the object class determined, is linked to the measured data entered in step 2, through which a more precise family of movement trajectories may be precalculated than would be possible without a vehicle dynamics model. In parallel to steps 1 to 4 of the flow chart, the data of the particular vehicle movement is detected in block 10 and a movement trajectory for the particular vehicle is determined in block 11. In step 5, a collision risk and an injury risk are determined on the basis of the family of movement trajectories which were determined for the particular vehicle and on the basis of the detected objects. This collision risk determines the probability that an impact of the collision risk may be a scalar value, which increases with the probability of an impact. Furthermore, it is also possible that the collision risk is a vectorial variable, through which the situation may be analyzed using multiple criteria. The injury risk determined, in contrast, considers the risk to the occupants of the vehicle, without considering the collision risk. This variable may also be made scalar or vectorial. A query as to whether the collision risk determined in step 5 is greater than a specific threshold value SW1 and whether the injury risk is greater than a specific threshold value SW2 is performed in step 6. If the variables of collision risk and injury risk determined in step 5 are vectorial dimensions, then a multicriteria query is necessary for the query in step 6. Thus, it is possible that only one single value of the factors collision risk and/or injury risk must fulfill the conditions or that all values of the factors must each fulfill the yes conditions. Furthermore, it is also possible that a specific pattern of the vectors must be fulfilled in order to proceed with a yes decision. If step 6 is answered with no, the sequence branches to loop A and begins again with step 1. If the branching in step 6 is to yes, preparatory measures for imminent emergency braking may be initiated. These preparatory measures may, for example, include informing the driver of the current collision risk using an acoustic, optical, or kinesthetic device or a restraint system for vehicle occupants being prepared and/or activated or the engine speed being reduced to idle speed or the transmission being put into neutral, so that power is no longer transmitted, or the measured data being stored in a non-volatile storage medium or a combination of the measures represented being performed. In the example represented here, only one threshold value is analyzed to perform one or more preparatory measures. However, it is also part of the present invention that a particular threshold value is defined for each individual one of the preparatory measures described, which must be exceeded for its particular activation. In this case, a decision step, similar to step 6, and an action step, similar to step 7, are performed in sequence for each action. In step 8 of the flow chart, it is decided whether the collision risk is greater than a threshold value SW2. If this is not the case, the chart branches to A, due to which the program jumps to the beginning and the algorithm begins again at step 1. If the condition in decision step 8 is to be answered with yes, then further processing is performed in step 9, in that the deceleration arrangement is activated. The decision in step A may also be performed here either in scalar form or in vectorial form, similarly to step 6. If the deceleration arrangement is activated in step 9, automatic emergency braking is initiated and the vehicle is braked until it is brought to a standstill or until aborting is decided to be more favorable after repeating the sequence of the flow chart. After activation of the deceleration arrangement in block 9, the flow chart jumps to step 1 and passes through this cycle from the beginning. In this case, the deceleration arrangement remains activated and may first be deactivated in the next pass, when the deceleration conditions are no longer fulfilled.

Figure 2:
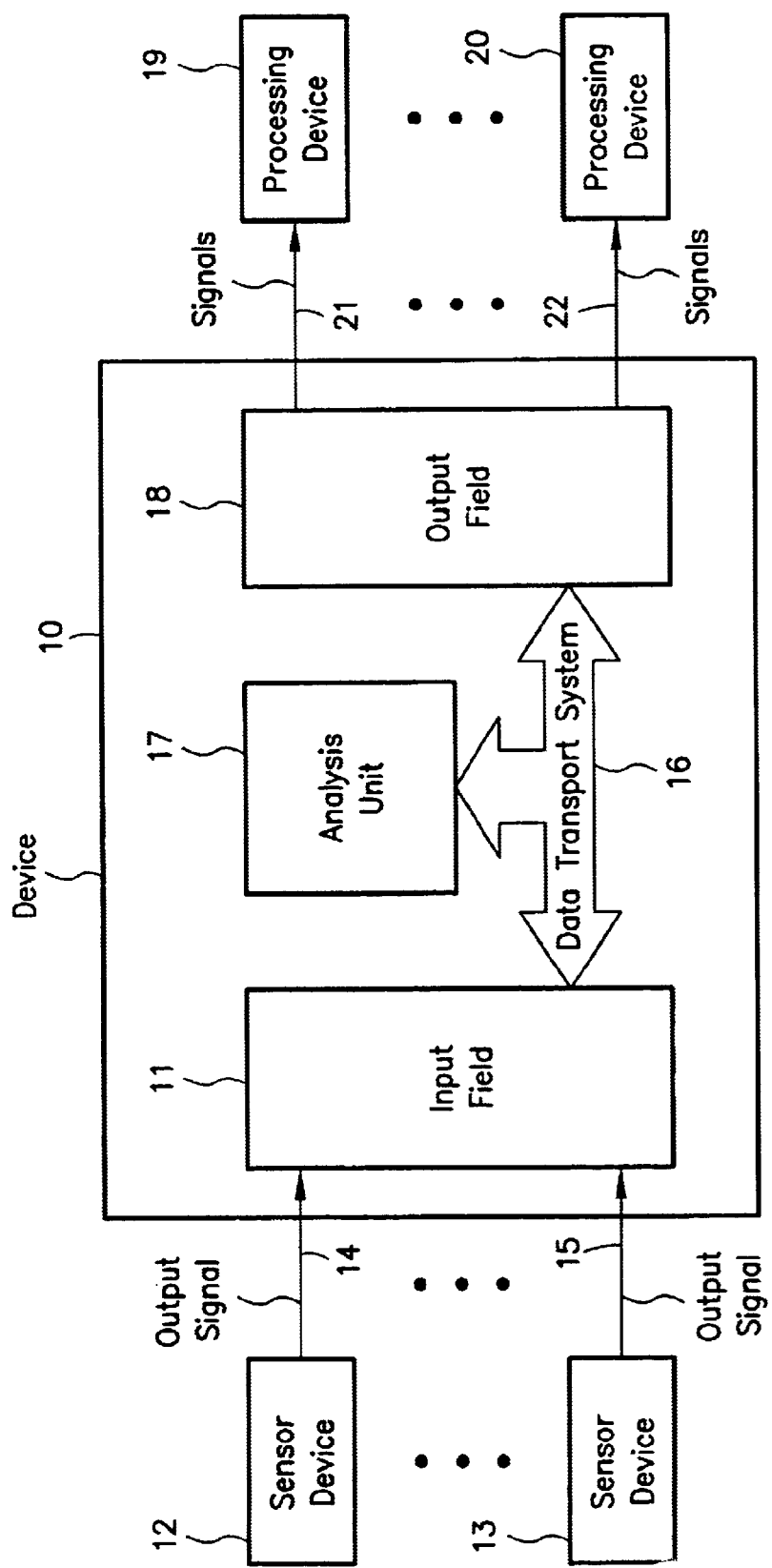
FIG. 2 shows a device for performing the method according to the present invention.

FIG. 2 shows a device according to the present invention for implementing the method according to the present invention. Device 10 for triggering and implementing a deceleration of a vehicle contains an input field 11, to which one or more input signals 14 to 15 of sensor devices 12 to 13 are supplied. A radar, lidar, or video sensor or a combination thereof may be considered as sensor devices 12 to 13, as well as further devices, using which the particular vehicle behavior may be detected. For example, devices for determining the particular vehicle's driving speed, yaw rate, movement direction, brake pedal operation, accelerator pedal operation, and a steering angle sensor are to be noted here. The signals arriving in input field 11 are supplied to an analysis unit 17 using a data transport system 16. The method of triggering and implementing vehicle deceleration to avoid a collision is performed in analysis unit 17. This analysis unit 17 outputs output signals depending on the vehicle situation and environmental situation, which are supplied to an output field 18 using data transport system 16. These are signals, for example, which inform the driver about the current collision risk in acoustic, optical, or kinesthetic form, or signals for preparing and/or activating restraint systems, such as airbags or seatbelt tensioners, or a signal is output to put the transmission in neutral, so that power is no longer transmitted or, in the event of an imminent collision, to store measured data which was supplied to input field 11 in a non-volatile storage medium. A further output signal which may be output via output field 18 is a signal for activating the deceleration arrangement. It is to be noted here that the deceleration arrangement are prepared before triggering the emergency braking, in that the brake system is prefilled and the brake linings are applied to the brake disks, without noticeable braking forces arising. A further output signal to the deceleration arrangement may represent the initiation of complete braking, through which maximum possible deceleration is applied. A further signal which may be supplied to the deceleration arrangement is a signal which causes partial deceleration, i.e., deceleration whose braking effect lies between the maximum possible braking effect and no braking effect. Signals 21 to 22 which are output via output field 18 are used as input variables for further processing devices 19 to 20. In particular, the deceleration devices are to be cited as possible devices 19, 20, however, the engine controller, the transmission controller, an operating data memory, a control unit for restraint systems, or a driver information device are also to be cited.

What is claimed is:

1. A method of triggering and implementing a deceleration of a vehicle to at least one of avoid a collision and reduce severity of an impact with a object, the method comprising:
   detecting an object in a sensor detection range using a device for adaptive cruise control of the vehicle;
   determining measured variables for the detected object;
   assigning the detected object to one of a plurality of object classes on a basis of the measured variables for the detected object;
   predicting movement trajectories for the detected object on a basis of the assignment of the detected object to the one of the plurality object classes;
   determining a collision risk on a basis of the predicted movement trajectories and the assigned object class of the detected object;
   determining an injury risk is on a basis of the predicted movement trajectories and assigned object class of the detected object; and
   activating deceleration devices of the vehicle in an event of at least one of a preselectable collision risk and a preselectable injury risk.

2. The method of claim 1, further comprising the step of:
   activating further vehicle functions as a function of the collision risk determined.

3. The method of claim 2, wherein the further vehicle functions include at least one of: (i) informing a driver of the vehicle about a current collision risk one of acoustically, optically, and kinesthetically, (ii) at least one of preparing and activating restraint system for vehicle occupants, reducing an engine speed to idle speed, (iii) putting transmission of the vehicle in neutral so that power is no longer transmitted, and (iv) storing the measured variables in a non-volatile storage medium.

4. The method of claim 1, wherein the device for adaptive cruise control of the vehicle includes at least one of a radar sensor, a lidar sensor and a video sensor.

5. The method of claim 1, wherein the measured variables include at least one of: (i) a relative speed of the detected object, (ii) a distance of the detected object, (iii) a horizontal dimension of the detected object, (iv) a vertical dimension of the detected object, (v) a geometry of the detected object, and (vi) a surface composition of the detected reflecting surface.

6. The method of claim 1, wherein the plurality of object classes include a person class, motorcycle class, a small passenger car class, a large passenger car class, a truck class, a bus class, a traffic sign class, and a building class.

7. The method of claim 1, wherein the assignment of the object to the one of the plurality object class is performed as a function of one of at least one of: (i)which sensor or sensor combination detects the object, and (ii) sensor or sensor combination is not able to detect the object.

8. The method of claim 1, further comprising:
   showing vehicle dynamics model for each of the plurality of object classes, from which a movement trajectory predicted for the detected object with aid of the measured variable determined for the detected object.

9. The method of claim 8, wherein, during precalculation of the movement trajectories, only trajectories which, as a consequence of a combination of steering and braking interventions, forces arising on wheels of the vehicle are not greater than a maximum force transmittable from a wheel onto a roadway are taken into consideration.

10. The method of claim 1, wherein the collision risk represents a probability of a non-preventable impact.

11. The method of claim 1, wherein the preselectable collision risk, in an event of which the deceleration devices of the vehicle are activated, is a threshold value.

12. The method of claim 11, wherein the threshold value is changeable as a function of a traffic situation.

13. The method of claim 1, wherein the injury risk represents an impact kinetic energy to be expected of an unavoidable impact.

14. The method of claim 1, wherein the preselectable injury risk, in an event of which the deceleration devices of the vehicle are activated, is a threshold value.

15. The method of claim 14, wherein the threshold value is changeable as a function of a traffic situation.

16. The method of claim 1, wherein, during precalculation of the movement trajectories, only trajectories which, as a consequence of a combination of steering and braking interventions, forces arising on wheels of the vehicle are not greater than a maximum force transmittable from a wheel onto a roadway are taken into consideration.

17. A device for triggering and implementing a deceleration of a vehicle to at least one of avoid a collision and reduce a severity of an impact with an object, the device comprising:

an object classification arrangement which assigns a detected object into one of a plurality of object classes;

a prediction arrangement which determines a trajectory movement as a function of the assigned object class for the detected object;

a collision risk determining arrangement which determines a probability of an injury of with the detected object;

an injury risk determining arrangement which determines a probability of an injury of occupants of the vehicle as a consequence of an impact with the detected object; and an arrangement for activating deceleration devices of the vehicle as a function of at least one of the probability of the impact and the probability of the injury;

wherein measured variables of a device for adaptive cruise control, which represent an object in a sensor detection range, are supplied to the device.

* * * * *